United States Patent Office 3,119,291
Patented Jan. 28, 1964

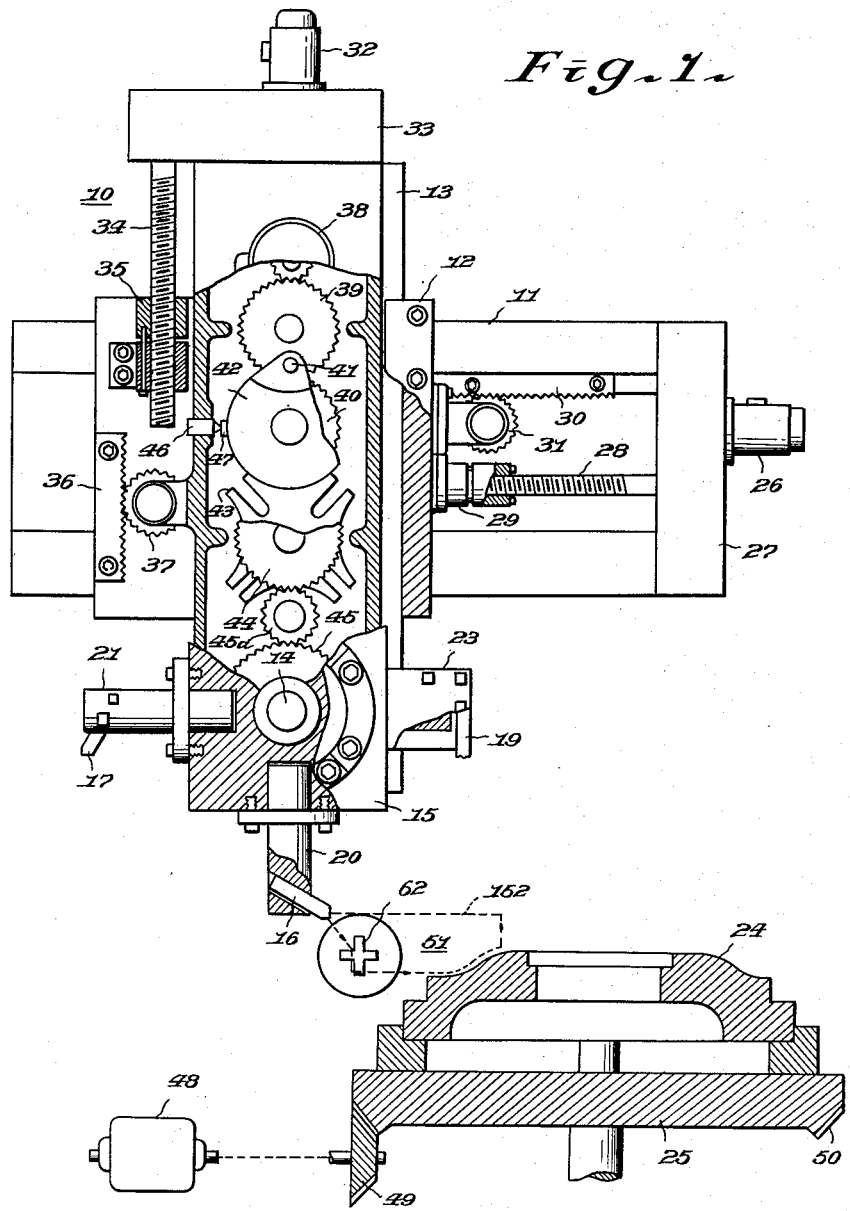

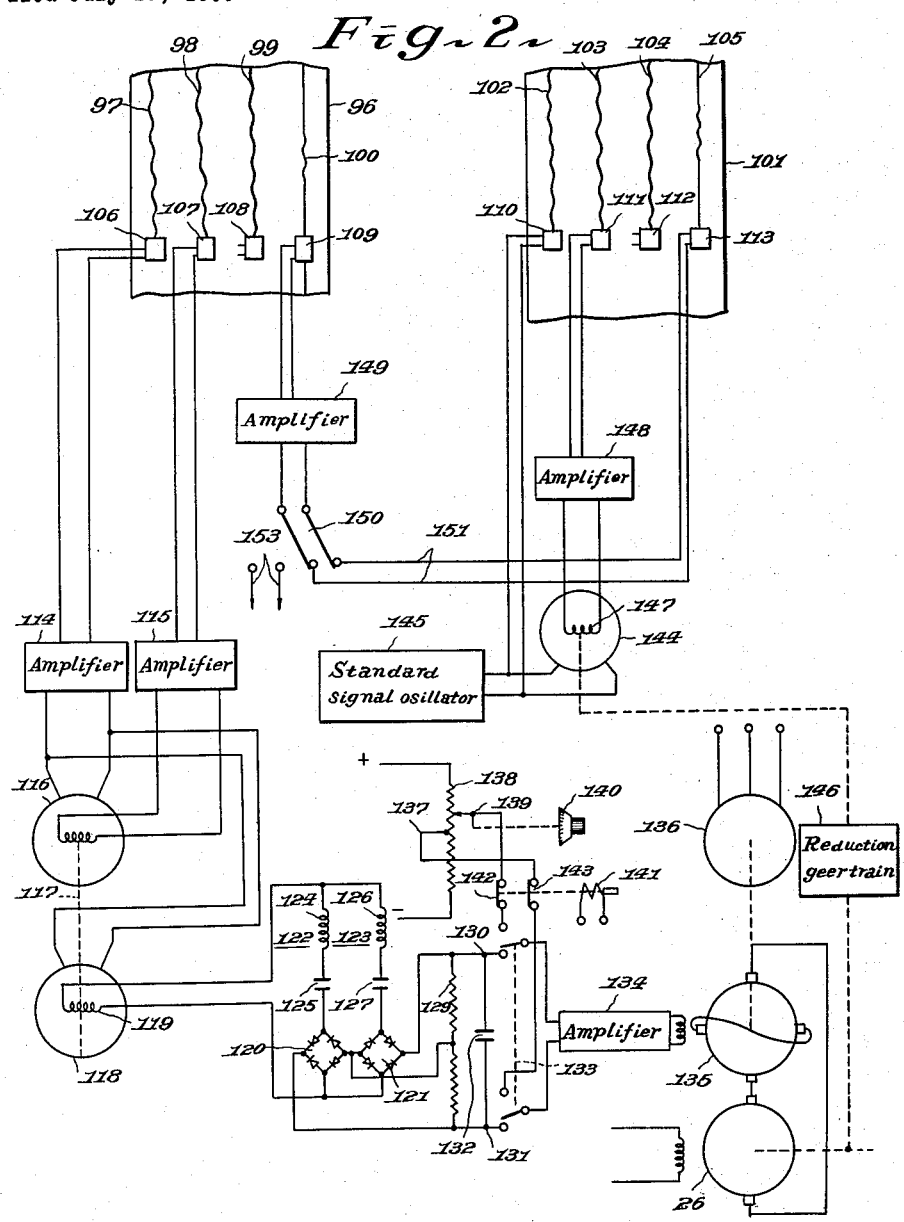

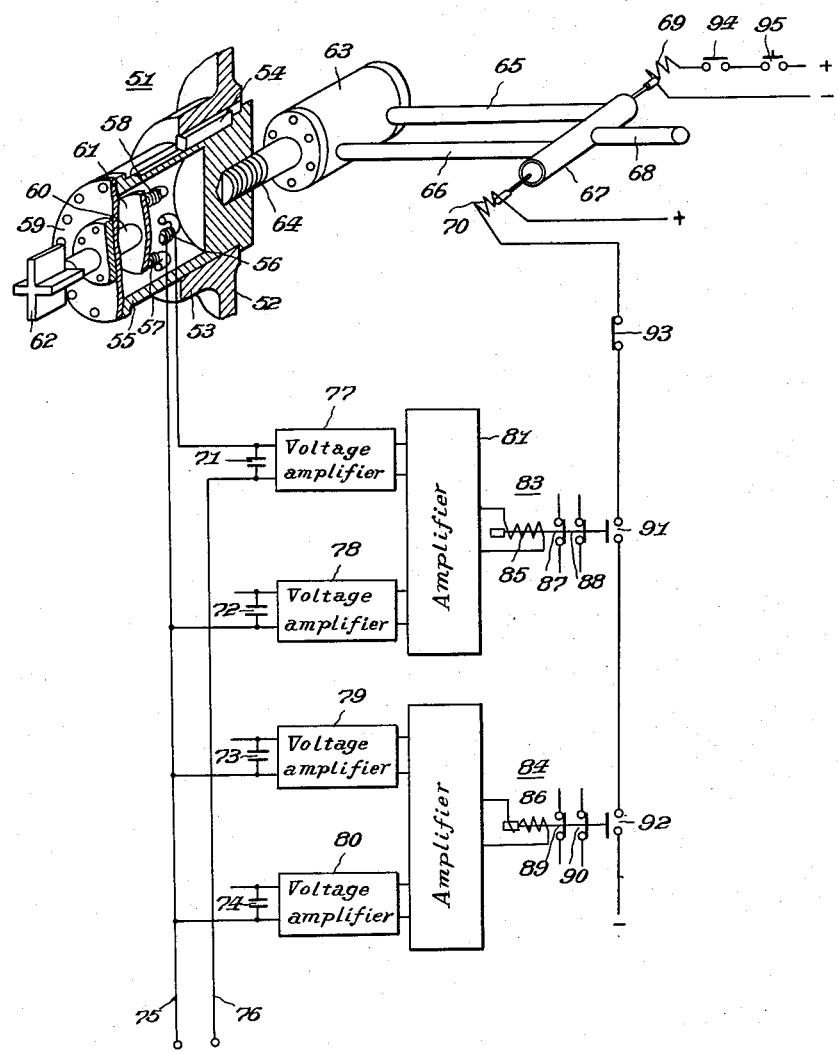

3,119,291
METHOD AND APPARATUS FOR AUTOMATIC CONTROL OF MACHINE TOOLS BY MEANS OF MAGNETIC RECORDING TAPES
Sueharu Mizunuma, Yokohama-shi, and Kiyoshi Sawada, Tsurumi-ku, Yokohama-shi, Japan, assignors to Toshiba Kikai Kabushiki Kaisha, Tokyo-to, Japan, a company of Japan
Filed July 13, 1959, Ser. No. 826,665
Claims priority, application Japan July 19, 1958
2 Claims. (Cl. 82—14)

This invention relates to a method and apparatus for automatic control of machine tools by means of magnetic recording tapes, more particularly, to a method of automatic control for multiple cutting tool lathe or turret lathe wherein each of the cutting tools or cutters mounted on a machine tool at random relative positions is made to travel correctly along its particular cutting path according to a predetermined program recorded on a magnetic tape.

In a machine tool such as a milling machine in which the cutting operation of a work is effected by use of a magnetic tape having thereon a record of a motion of the tool, when the cutting operation is performed by moving the cutting tool along a side surface of a stationary work to be cut in accordance with a reproduction of a control signal recorded on a magnetic tape, a slight difference in the starting position of the tool would not generally result in any undesirable effect. Thus, even when the starting position of the cutting tool relative to the position of the work to be cut is somewhat displaced from a predetermined correct position, it is possible to obtain identical finished products after the cutting operation as long as all cutting paths of the cutting tools are contained in the works. However, in a machine tool for cutting any rotating work, displacement of the starting position of the cutting tool in the radial direction of the work would result in producing products of different diameters. Moreover, taking the same work, even when a correct cutting is attained by a first cutting tool, if a second cutting tool were displaced from a correct relative position, the surface worked by the second cutting tool would not be correct. Accordingly, for eliminating the above-mentioned disadvantage, it is necessary to mount the second cutting tool on a correct position with respect to that of the first cutting tool by using an appropriate mounting gauge. However, in a machine tool having many cutting tools, such as a turret lathe, the operation for mounting individual tools on predetermined relative positions by using a gauge requires much time and experience. In some machining operations, it is often desirable to cut a relatively small number of works according to a predetermined program by utilizing a magnetic tape. When works of a small number are to be worked by such a machine tool having many cutting tools as a turret lathe, much time is required, as pointed out above, for mounting the cutting tools in predetermined relative positions before the cutting operation, whereby the working time per work is made longer and hence the finished products become too expensive. Moreover, when a plurality of cutting tools are to be mounted in predetermined relative positions by using a gauge, if there is any error in the mounting position of the tool mounted first, this error causes error in the mounting positions of the succeeding tools, thus causing successive accumulation of errors.

Accordingly, an object of this invention is to provide an improved method of automatic control for machine tools wherein many cutting tools are made to travel accurately along their predetermined cutting paths under the control by magnetic tapes.

A further object of this invention is to provide an improved method of controlling machine tools by means of magnetic tapes wherein correct mounting of a plurality of cutting tools on predetermined relative positions is not necessary, thus permitting less time and skill for mounting the cutting tools.

A still further object of this invention is to provide a novel method of controlling machine tools by means of magnetic tapes wherein the accumulation of errors of the mounting positions of a plurality of cutting tools is avoided.

Another object of this invention is to provide an automatic control device for machine tools which is simple in construction and easy in manual handling.

Still another object of this invention is to provide an automatic control device for machine tools including a plurality of cutting tools which are mounted on a tool rest wherein said tools are made to travel in predetermined relations along their cutting paths.

According to the method of this invention, the movement of a tool rest which is induced by automatic control caused by reproduction of control signals recorded on a magnetic tape, each of said signals corresponding to each of plurality of cutting tools mounted on said tool rest and the movement of the tool rest which is induced when the tip of each tool is manually adjusted to the starting point having coordinates specific to the machine are recorded alternately on a continuous second tape, and in the actual cutting operation said second tape is reproduced to make said cutting tools travel along their respective cutting paths while maintaining predetermined relations therebetween.

The control device embodying this invention comprises a tool rest for mounting thereon a plurality of cutting tools, means for feeding said tool rest, a rotating table for supporting a work to be worked by said cutting tools mounted on said tool rest, a first magnetic tape having thereon a plurality of records corresponding to the control signals for cutting paths of said cutting tools mounted on said tool rest, means for reproducing the records on said first magnetic tape for controlling said feeding means, means for transforming the movement of said tool rest into a corresponding electric signal, a second magnetic tape for recording the output signal of said transforming means, and means for adjusting the starting point of the tip of each cutting tool on said tool rest to a predetermined position, said second magnetic tape being arranged in such a manner that the movement of the tool rest which is induced when each cutting tool is brought in coincidence with a predetermined starting point by the action of said starting point adjusting means and the movement of the tool rest which is induced when the path of each tool is controlled by the reproduction of the records of said first magnetic tape are recorded on said second magnetic tape and the records of said second magnetic tape are reproduced to make the cutting tools move successively along their predetermined paths.

This invention may be more fully understood from the following detailed description taken in connection with the accompanying drawings, in which:

FIG. 1 is an elevation showing the essential portion of a vertical turret lathe, one portion being broken away and one portion being in section, to which this invention may be applicable;

FIG. 2 shows a connection diagram of an electric circuit for preparing the second magentic tape for use in play back in accordance with this invention;

FIG. 3 shows a connection diagram for explaining operation of the means of adjusting the cutting tool starting point.

While in the following a control device embodying this invention for a turret lathe having a rotary tool rest is shown and described, it will be understood that application of this invention is not limited only to turret lathes, but also may be similarly applied for other machine tools such as a multi-cutting tool lathe and the like.

First, the outline of a turret lathe will be explained with reference to FIG. 1 of the accompanying drawings. The turret lathe generally shown by the numeral 10 in FIG. 1 comprises a horizontal beam 11, a horizontal slide 12 mounted on said beam to be movable in the horizontal direction, a vertical slide 13 mounted on said horizontal slide to be slidable in the vertical direction, a rotary tool rest 15 mounted for rotation around a shaft 14 provided beneath said vertical slide, a plurality of tool supporting shanks 20, 21 and 23 secured around the rotary tool rest 15 by suitable means, each shank supporting each one of a plurality of cutting tools 16–19 at one end, and a rotary table 25 for supporting and rotating a work 24 which is to be worked by said tools. For moving said horizontal slide 12 along the horizontal beam 11, there are provided on the horizontal beam 11, a horizontal feed electric motor 26, a reduction gear box 27, a feed screw 28 which is driven at a reduced speed in the forward or reverse direction by said electric motor 26 through said gear box, and a feed nut 29 mounted on said horizontal slide 12 and engaged with said feed screw 28. On the horizontal beam 11, there is also provided a rack 30 meshing with a pinion 31 which is pivoted on the horizontal beam 11 to guide the horizontal slide in the horizontal direction. For moving the vertical slide 13 and hence the tool rest 15 in the vertical direction, a vertical feed electric motor 32 and a reduction gear box 33 are provided at the top of the vertical slide, and there are also provided a feed screw 34 driven by the electric motor 32 through said gear box and a nut 35 which is secured to said vertical slide 13 and meshed with said screw 34. For guiding the vertical movement of the vertical slide 13, there is provided a rack 36 secured to the horizontal slide 12 and meshed with a pinion 37 supported by the vertical slide.

Any suitable indexing mechanism is disposed on the vertical slide 13 for turning the tool rest 15 to bring the next tool to its predetermined operative position. This mechanism comprises a turret indexing electric motor 38 secured to any convenient position of the vertical slide 13, gears 39 and 40 driven by said motor, a cam plate 42 secured to the gear 40 and having one Geneva pin 41 secured on its peripheral portion, a Geneva gear 43 which is arranged to be intermittently driven by the engagement with the pin 41 when said cam plate rotates, a gear 44 secured to the Geneva gear, and a gear 45 mounted on the tool rest 15 and meshed with said gear 44 through a gear 45a. For rotating the rotating tool post 15 by 90°, for instance, and then stopping it at the new position, a control switch 46 is provided at a predetermined position of the vertical slide 13 for opening the energizing circuit of the electric motor 38, said switch being arranged to be operated by a projection 47 on the periphery of said cam 42. Upon closure of said energizing circuit, the electric motor 38 will rotate the cam plate 42. Then, the Geneva pin 41 will engage in a slot of the Geneva gear 43 to rotate it. Thus, the cam plate 42 will make one revolution from the position shown in the drawing while the Geneva gear 43 makes ¼ revolution. When the cam plate 42 completes one revolution, the projection 47 will engage with the limit switch 46 to actuate it, thus stopping the electric motor 38. In this way, one revolution of the Geneva gear results in 90° rotation of the tool rest 15, whereby the next cutting tool is brought to its predetermined cutting position.

An electric motor 48 is provided for driving the rotary table 25 supporting a work 24, and a bevel gear 49 driven by the shaft of said motor 48 is in engagement with the teeth 50 on the periphery of said table 25.

A device 51 for adjusting the starting point of the cutting tool is provided near the rotary tool rest 15 so that it can reciprocate in the direction perpendicular to the sheet of the drawing. As shown in FIG. 3, this device 51 comprises a cup-shaped piston member 55 slidably fitted in a cylinder 53 and prevented from circumferential movement by a key 54, said cylinder being supported on a pedestal 52 of the turret lathe, four induction coils 56, 57, 58 (one of the coils being not shown in the drawing) arranged in said piston member 55 at 90° intervals, a disc spring 59 non-rotatively mounted on the piston member 55 to close its left hand opening, a rod 60 extending through the disc spring 59 and fixed at its intermediate portion to said spring, a magnetic disc 61 attached to the right-hand end of said rod at a position spaced from the induction coils, and a cross stylus 62 fixed to the left end of the rod 60. Operating cylinder 63, for instance, is provided for advancing the starting point adjusting device 51 to a point near the rotary tool rest of the turret lathe and for retracting the adjusting device when it is not used and one end of the piston rod 64 is connected to the back or right-hand end of the piston member 55, as shown in the drawing. Two air pipes 65 and 66 communicated with the operating cylinder 63 are connected with an air supply pipe 68 through an electromagnetic valve 67 which is arranged in such a manner that when its coil 69 is energized, the pipe 65 is communicated with the pipe 68 to introduce compressed air into the cylinder 63 to advance the device 51 and that when the other coil 70 is energized, the pipe 66 is communicated with the pipe 68 to introduce compressed air into the cylinder 63 to retract the device 51. The cross stylus 62 is provided with four quadrants which are brought into engagement with the tip of the tool, from right upper, right lower, left upper and left lower directions, respectively. Each of the induction coils 56, 57, 58 and one other not shown is connected in series with one of the condensers 71, 72, 73 and 74 and energized from an alternating current source of a constant frequency through the lines 75 and 76. Each circuit consisting of an induction coil and a condenser constitutes a series resonance circuit, but the inductance of each induction coil is so designed to have a value not to produce a series resonance at the frequency of the electric source when the stylus does not receive any biassing force from left, right, upper or lower direction, that is, when the stylus is maintained at the normal condition where the magnetic disc is positioned at a predetermined distance from each induction coil. However, when the stylus is pushed by the tool from upper, lower, right or left direction, the rod 60 is tilted because of flexure of the disc spring 59, thus tilting the magnetic disc 61, whereby the distance between said disc and some of the induction coils will be reduced to increase the inductance of said coil or coils. If it is so designed that said increased inductance and capacitance of the condenser connected in series to the induction coil, the inductance of which has been increased, resonant at the source frequency, a large voltage will appear across the terminals of said condenser under series resonance. Thus, it is possible to detect the direction in which the biassing force is applied to the stylus from tool. Condensers combined with a pair of coils 56 (one being not shown) arranged in the horizontal direction are designated by numerals 71 and 72 and the condensers combined with a pair of coils 57 and 58 arranged in the vertical direction are shown by numerals 73 and 74. Thus, when the tool 16 comes into contact with the stylus 62 from the left upper direction, as shown in FIG. 1, a detecting voltage will appear across the condensers 71 and 74. In this way, a detecting voltage is obtained across the terminals of the condenser 71 when the tool engages with the stylus from the left side, across the condenser 72 when the tool engages with the stylus from the right side, across the condenser 73 when the tool engages with the stylus from the lower side and across the condenser 74 when the tool engages with the stylus from the upper side.

The terminals of said condensers 71—74 are connected with voltage amplifiers 77, 78, 79 and 80, respectively, the output terminals of the amplifiers 77 and 78 being connected with the input terminals of a power amplifier 81 and those of the amplifiers 79 and 80 with the input terminals of a power amplifier 82. The output terminals of the amplifiers 81 and 82 are connected with the operating coils 85 and 86 of relays 83 and 84, respectively, each having a pair of normally closed contacts 87, 88 and 89, 90 and normally opened contacts 91 and 92, respectively. The relay 83 serves as a limit switch for the horizontal feed motor 26 of FIG. 1, more particularly, whenever the rotary tool rest 15 is moved rightward or leftward to adjust the starting point of the rotary tool rest, the relay 83 is actuated to open the contacts 87 and 88 upon engagement of the tool tip with the stylus from the right or left side. The contacts 87 and 88 are connected in the energizing circuit of the motor 26 and arranged to stop the motor when they are opened. Similarly, the relay 84 serves as a limit switch for the vertical feed motor 32 and is operated when the tool tip is adjusted in the vertical direction to a predetermined starting point, thus opening the contacts 89 and 90 for stopping the motor 32. Thus, when both the horizontal and vertical directions of the rotary tool rest 15 are adjusted to the predetermined position, both the relays 83 and 84 operate to close their normally opened contacts 91 and 92. These contacts are connected in series and in turn connected in series with the contact 93 adapted to be closed when the starting point adjusting device 51 is in its forward position and with a coil 70 connected to a direct current source indicated by + and − in the drawing. Then, when the tool is adjusted to the correct starting point, the coil 70 is energized to automatically withdraw the starting point adjusting device 51 to a retracted position where the movement of the rotary tool rest is not interfered with. In response to said withdrawal of the device 51, the contact 93 is opened to open the circuit of the coil 70. In series with a coil 69 are provided a contact 94 which is arranged to be closed in response to opening of the contact 93 and a push button switch 95, said series combination being connected across a direct current source indicated by + and −. This circuit is used for the purpose of moving the device 51 in the forward direction.

The device shown in FIG. 2 is provided for effecting correct movement of various tools mounted on the rotary tool rest 15 of FIG. 1 along their predetermined paths. For simplification of description, only the control circuit for the horizontal feed motor 26 is illustrated in the device of FIG. 2. However, it will be obvious to those skilled in the art that a similar circuit is also used for the control of the vertical feed electric motor 32. There is provided a magnetic tape 96 upon which are recorded the movements of all tools. For the purpose of clarifying the drawing, the winding reel, capstan and pay out reel, etc. for driving the tape are omitted from the drawing. There are recorded on this tape at least four tracks, for instance, a track 97 of record for the reference signal (preferably an alternating current of about 400 cycles per second), a track 98 of record for the horizontal feed signal the phase of which is displaced, with respect to the reference signal, by an amount of horizontal feed, a track 99 of record for the vertical feed signal the phase of which is displaced, with respect to the reference signal, by an amount dependent upon the amount of vertical signal, and a track 100 of record for auxiliary signals for effecting starting and stopping of the table driving motor and other functions. Since the method of preparing such a magnetic tape as described above is well known in the art, only a brief explanation is given herein in the following. First, program cards related to the dimensions of the works and amount of feed of the tools are prepared in accordance with manufacturing drawings and then perforated tapes are prepared by combining said cards in a desired order. These tapes are then passed through a calculator to generate electric impulses the number of which depends upon the amount of feed. By use of a suitable tape recorder, the reference signal is recorded as the track 97 on the magnetic tape 96 and horizontal feed and vertical feed signals are also recorded as the tracks 97 and 98, respectively, said feed signals being produced by phase modulation of said reference signal in response to the number of said electric pulses. Said auxiliary signals are also recorded as the track 100. The magnetic tape thus recorded will hereinafter be called the "first tape."

In this invention, the first tape is used only once in the preparation step before the actual cutting operation. There is provided another magnetic tape 101 which will hereinafter be called the "second tape." This second tape is adapted to be passed through a tape recorder not shown for recording the movement of the tools throughout their steps and comprises a track 102 for recording the reference signal, a track 103 for recording the amount of horizontal feed, a track 104 for recording the amount of vertical feed and a track 105 for recording auxiliary signals.

Reproducing heads 106, 107, 108 and 109 are associated, respectively, with the tracks of the first tape for effecting the control of the paths of the tools. Similarly, recording heads 110, 111, 112 and 113 are associated, respectively, with the tracks of the second tape for recording thereon the motion of the rotary tool rest. The outputs of the heads 106 and 107 associated with the first tape are amplified, respectively, by amplifiers 114 and 115, the output of these amplifiers are impressed, respectively, to the stator winding and the rotor winding of a Selsyn motor 116. With such arrangement, it is possible to rotate the rotary shaft of the Selsyn motor in a direction at a speed dependent upon the difference in phase, i.e. upon the frequency difference between the signals of the tracks 97 and 98 of the first tape. On the shaft 117, there is mounted the rotor 119 of a Selsyn transformer 118 whose stator is so connected with the output terminals of the amplifier 114 as to be energized by the amplified reference signal. As the rotor of the Selsyn transformer 118 rotates as stated above, a signal voltage the frequency of which varies about that of the reference signal in accordance with the amount of horizontal feed will be produced across its winding terminals. For converting such signal voltage dependent upon the amount of horizontal feed into two direct current voltages the polarities of which are varied in response to the direction of feed and the amplitude of which are in proportion to the amount of feed, series resonance circuits 122 and 123 connected in parallel to be energized from the winding terminals of the rotor 119 are provided, each comprising one of serially connected full wave rectifiers 120 and 121. One series resonance circuit 122 comprises a reactor 124 and a condenser 125 having constants such as to resonate at a predetermined frequency slightly lower than that of the reference signal recorded on the track 97 of the first tape 96 while the other series resonance circuit 123 comprises a reactor 126 and a condenser 127 having constants such as to resonate at a predetermined frequency slightly higher than that of said reference signal. The direct current output terminals of the rectifiers 120 and 121 are, respectively, connected across resistors 128 and 129 which are so connected in series that a resultant signal consisting of two oppositely superimposed direct current signals can be led out from the outside terminals 130 and 131 of the resistors 128 and 129. Assuming now that if a rightward horizontal feed signal is transmitted from the Selsyn transformer 118, there will be obtained a direct current signal voltage which decreases the current in the resonance circuit 122 and increases the current in the resonance circuit 123 to make the terminal 130 positive and the terminal 131 negative. Similarly, when a leftward horizontal feed signal is transmitted from the Selsyn transformer 118, there will be obtained a direct current signal voltage which increases the current in the resonance circuit 122 and decreases the current in the resonance circuit 123 to make the terminal 130 negative and the terminal 131 positive.

For eliminating pulsations contained in these direct current voltages to obtain sufficiently smooth direct current voltages, a condenser 132 is connected with the terminals 130 and 131. These terminals are arranged to be connected with the input terminals of a direct current amplifier 134 through the lower terminals of a change-over switch 133 as shown in the drawing, said amplifier being utilized to energize the field winding of an armature reaction type amplifying generator 135, for example, for controlling the horizontal feed motor 26 through a Ward-Leonard system. A suitable driving motor such as an induction motor 136 is provided for driving the amplifying generator 135 at a constant speed. In commencing the path control of a tool mounted on the rotary tool rest 15, it is required to position the tool at the correct starting point with the aid of the starting point adjusting device 51. Such adjustment is manually achieved by controlling the rotary tool rest 15 to a predetermined position. For attaining this object, a variable potentiometer or voltage divider 138 having an intermediate tap 137 and connected across a constant direct current voltage source indicated by + and − in FIG. 2 is provided. A sliding contact 139 of said voltage divider is connected with a manually operated vernier dial 140 to be operated thereby. There is provided an electromagnetic relay 141 including a pair of normally opened contacts 142 and 143 which are manually closed when a predetermined path control of one tool has been completed by the first tape and are opened automatically when the next tool is positioned at the correct starting point. When the change-over switch 133 is moved to the upper position from the lower position as shown in FIG. 2, the sliding contact 139 of the voltage divider 138 is connected with one of the input terminals of the amplifier 134 through a contact 142 of the relay 141 and the upper contact of the change-over switch 133, while the intermediate tap 137 of the voltage divider is connected with the other input terminals of the amplifier 134 through the other contact 143 of the relay 141 and the upper contact of the change-over switch 133. Thus, whenever the sliding contact 139 of the voltage divider 138 is moved up and down by operating the vernier dial 140, a direct current signal voltage is obtained at the input terminals of the amplifier 134, the polarity and magnitude of said voltage being made to vary, respectively, in response to the direction of the motion of the sliding contact 139 and to the position of the sliding contact. After amplification, this signal voltage is impressed upon the field winding of the amplifying generator 135, whereby the horizontal feed motor 26 is energized by the induced voltage of the amplifying generator 135 to feed the rotary tool rest in the horizontal direction. In such a manner as described above, it is possible to adjust the rotary tool rest to any desired horizontal position by adjustment of the vernier dial 140.

For recording movement of the rotary tool rest on the second tape 101 throughout the cutting operation, Selsyn transformer 144 and a standard signal oscillator 145 are provided, as shown in FIG. 2. Output signal from the standard signal oscillator 145 is impressed upon a recording head 110, whereby a standard signal is recorded on the track 102. The rotor 147 of the Selsyn transformer 144 is so coupled directly with the shaft of the horizontal feed motor 26 through a reduction gear train 146 that it is possible to rotate said rotor in a direction dependent upon the direction of the horizontal feed at a speed proportional to the speed of feed. The stator of the Selsyn transformer 144 is connected to be energized from said standard signal oscillator 145 and the winding terminals of the rotor 147 are connected with the recording head 111 via an amplifier 148. Thus, a signal is produced in the rotor of the Selsyn transformer 144, the phase of said signal being made to vary with respect to the standard signal in response to the direction and amount of horizontal feed of the rotary tool rest, whereby it is made possible to record said signal on the track 103.

Although not shown in the drawing, the vertical feed motor 32 of FIG. 1 for the rotary tool rest is provided with the same control device as above, thereby the movement of the rotary tool rest caused by the track 108 of the first tape 96 and the vernier dial for the vertical feed can be recorded on the track 104 of the second tape 101.

During the above operation, starting and stopping signals and other auxiliary signals are reproduced from the track 100 of the first tape 96 and then transmitted to the recording head 113 through the amplifier 149, change-over switch 150, and circuit 151. The signals transmitted in the recording head 113 are directly recorded on the track 105 of the second tape 101.

For recording on the second tape 101 shown in FIG. 2, the sliding contact 139 of the voltage divider 138 at first is adjusted to coincide with the intermediate tap 137, the change-over switch 133 is changed over to the upper position, and the contacts 142 and 143 of the relay 141 are closed while stopping the first and second tapes 96 and 101. Then, the indexing motor 38, FIG. 1, is energized to rotate the rotary tool rest 15 so as to bring the tool 16 effecting the first cutting operation to the position just beneath the vertical slide. Thereafter, the push button 95, FIG. 3, is pressed to advance the starting point adjusting device 51. By the adjustment of the vernier dial 140, horizontal and vertical feeds are given to the rotary tool rest to align the tip of the tool 16, FIG. 1, to coincide with the stylus in both the horizontal and vertical directions. Thus, when the tip of the tool 16 assumes the correct starting position, the relays 83 and 84, FIG. 3, operate to stop the horizontal and vertical feeds, thus stopping the rotary tool rest. Under the cooperative function of said two relays the starting point adjusting device 51 will be withdrawn automatically to the retracted position.

Upon completion of the above-mentioned preparation, the changeover switch 133, FIG. 2, is closed to the lower position and the first and second tapes are started without mounting a work on the table 25, FIG. 1. The horizontal feed signal of the track 98 of the first tape 96 is compared with the reference signal of the track 97 by the Selsyn motor 116, thereby energizing the horizontal feed motor 26 to effect control of the rotary tool rest 15 and thus the control of the path of the tool 16. Identical control is also effected in connection with the vertical feed. In this way, path control is effected along a path 152 indicated in FIG. 1. This path control is recorded on the tracks 102 and 103 of the second tape 101 by the Selsyn transformer 144 connected with the feed motor 26, FIG. 2.

Upon completion of the path control of the first tool 16, the first tape 96 is stopped. The second tape 101, however, is moved continuously. The push button switch 94, FIG. 3, is pressed to advance the starting adjusting device and the change-over switch 133, FIG. 2, is closed to the upper side. Of course, it will be understood that the sliding contact 139 of the voltage divider 138 is in coincidence with the intermediate tap 137 and the relay 141 is operated to close its contacts 142 and 143. Although not illustrated in the drawing, it will also be understood that a suitable automatic control circuit capable of energizing the electric motor 38 (see FIG. 1) in response to completion of the path control of the first tool 16 to turn the rotary tool rest 15 to bring the second tool 17 just beneath the vertical slide is provided. The rotary tool rest 15, FIG. 1, is manually fed by turning the vernier dial 140, FIG. 2, for bringing the second tool 17 into contact with the stylus from horizontal and vertical directions. This path control is recorded on the second tape 101 contiguous with the path control of the first tool 16. When the starting point of the tip of the second tool is adjusted, feeding of the tool rest is stopped and the starting point adjusting device 51 is withdrawn to the retracted position where it does not interfere with the motion of the tool rest.

Then, the first tape 96 is started to effect the path control of the second tool, FIG. 1. Similarly this path control of the second tool is also recorded on the second tape 101.

The above-mentioned operation is repeated for the third tool (not shown) and the fourth tool 19, FIG. 1, and after completion of the path control of the last fourth tool 19, the rotary tool rest 15 is so rotated as to bring the first tool 16 to the position just beneath the vertical slide and its tip is adjusted to the correct starting point by the starting point adjusting device 51. After continuous recording of all said path controls on the second tape, this second tape is stopped. In this way, preparation of the second tape 101 is completed.

In actual cutting operation, the work 24 is so mounted on the table 50 that each of the various surfaces to be cut is positioned in the respective path of a tool, as shown in FIG. 1. The first tape 96 is removed and the second tape 101 is mounted in place of it. For effecting starting and stopping of the rotary table and other auxiliary operations, the change-over switch 150 is changed to the left position to connect a control circuit 153 for causing auxiliary operations with the reproducing head 109. The reference signal oscillator 145 and other devices which are required for the recording of the second tape are stopped. The change-over switch 133 is moved to the lower position to control the amplifying generator 135 and the horizontal feed motor 26 by means of the horizontal feed signal from the second tape. Thereafter, it is only required to start and reproduce the second tape 101. Thus, when the second tape is reproduced, the first tool 16, FIG. 1, situated at a predetermined position, will be moved along a predetermined path shown by dotted lines 152 to cut the desired surfaces of the work 24 to be cut. Upon completion of this cutting operation, the rotary tool rest 15 is rotated to bring the second tool to the position just beneath the vertical slide, whereby said tool is brought to a correct starting point in accordance with a record of the second tape and thereafter is transferred along a predetermined cutting path according to the succeeding record. Thus, the cutting operation by the third and fourth tools will be accomplished. When the cutting operation by the fourth tool is finished, the rotary tool rest 15 is rotated so as to bring the first tool 16 to the position just beneath the vertical slide, whereby said tool is brought to the correct starting position according to the record of the second tape and then stopped. As described above, the work 24 is worked by all of a plurality of the tools 16, 17 and 19 to produce a finished product. During this operation, the auxiliary signals produced by the second tape function to start and stop the table 25 at given times and to give a starting signal to the indexing motor 38 of the tool rest 15.

The next cutting operation can be started by the steps of removing the work 24 from the table, mounting the next work on the table 25 in such a manner that various surfaces of said work to be cut are brought into the paths of the tools, and then starting the second tape in the same way as described above. Works of any desired number can be sequentially and automatically worked by use of the second tape.

As will be noted from the above description, according to this invention, it is possible to accurately control the path of each tool even when there is irregularity in the relative mounting positions of many tools. In addition, since the tools are not required to be mounted in accurate predetermined relations, it is possible to save the time necessary for mounting tools. Moreover, since it is not required to correct the relative mounting positions of the cutting tools by using a gauge, there is no fear of accumulation of errors in the mounting positions of the tools, whereby it is possible to carry out correct movement of many tools along their paths.

What we claim:

1. Apparatus for automatic control of machine tools by means of magnetic recording tapes, which comprises a tool holder for mounting a plurality of tools thereon, tool holder feed means connected to said tool holder for feeding said tool holder, reproducing means connected to said tool holder feed means for reproducing recorded signals on a first magnetic tape with recorded signals thereon corresponding to cutting paths of said tools, for controlling said tool holder feed means, means connected to said tool holder feed means for transforming the movement of said tool holder into corresponding electric signals, a recording means connected to said transforming means for recording the output of said transforming means on a second magnetic tape, and adjusting means connected to said tool holder feed means for adjusting starting point of the tip of each tool to a predetermined position, said adjusting means comprising a manually actuated energizing means connected to said tool holder feed means for energizing said tool holder feed means for moving said tool holder, and feeler means movable into the proper starting position for said tools and connected in the energizing circuit of said tool holder feed means for deenergizing said circuit when a tool engages said feeler means, whereby the movement of said tool holder which is induced when each of said tools is moved to said predetermined starting point by the action of said starting point adjusting means and the movement of said tool holder which is induced when the paths of said tools are controlled by the first magnetic tape is recorded on the second magnetic tape and the second tape can be used and to reproduce the movements recorded thereon to sequentially move said tools along predetermined paths.

2. An apparatus as claimed in claim 1 in which said feeler means comprises a feeler having one end for engagement by a tool in said tool holder, a magnetic disc on the other end of said feeler, a resilient disc in which said feeler is mounted for movement in any direction, a plurality of induction coils positioned adjacent said magnetic disc the inductions of which are changed by movement of said magnetic disc toward and away from said coils, and normally closed relay means in the energizing circuit for said tool holder feed means, said relay means being connected to said induction coils and energized to the open position on a change in induction in said coils.

References Cited in the file of this patent

FOREIGN PATENTS 1,114,501    France _____ Dec. 19, 1955